US009442720B2

(12) United States Patent
Velusamy

(10) Patent No.: US 9,442,720 B2
(45) Date of Patent: Sep. 13, 2016

(54) ADDING ON-THE-FLY COMMENTS TO CODE

(71) Applicant: PayPal, Inc., San Jose, CA (US)

(72) Inventor: Lakshmanan Velusamy, Bellevue, WA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 14/190,783

(22) Filed: Feb. 26, 2014

(65) Prior Publication Data

US 2015/0242206 A1   Aug. 27, 2015

(51) Int. Cl.
*G06F 9/44* (2006.01)
*G06F 3/048* (2013.01)
*G06F 17/25* (2006.01)
*G06F 17/28* (2006.01)
*G10L 15/26* (2006.01)

(52) U.S. Cl.
CPC . *G06F 8/73* (2013.01); *G06F 8/33* (2013.01); *G06F 9/4448* (2013.01); *G06F 17/289* (2013.01); *G06F 8/70* (2013.01); *G10L 15/26* (2013.01)

(58) Field of Classification Search
CPC .... G06F 8/73; G06F 8/3073; G06F 11/3409; G06F 11/3466; G06F 17/21; G06F 17/28; G06F 17/2827; G06F 9/4448; G06F 8/36; G06F 8/70; G06F 8/33; G06F 8/41; G10L 15/26; G10L 13/00
See application file for complete search history.

(56) References Cited

U.S. PATENT DOCUMENTS

| | | | | | |
|---|---|---|---|---|---|
| 5,513,305 | A | * | 4/1996 | Maghbouleh | G06F 8/33 715/234 |
| 5,613,122 | A | * | 3/1997 | Burnard | G06F 9/4448 713/1 |
| 5,652,884 | A | * | 7/1997 | Palevich | G06F 9/4448 707/999.1 |
| 7,346,849 | B1 | * | 3/2008 | Mulligan | G06F 8/41 715/763 |
| 2003/0163323 | A1 | * | 8/2003 | Bluvband | G06F 8/73 704/275 |
| 2005/0229156 | A1 | * | 10/2005 | Baumann | G06F 8/73 717/110 |
| 2006/0020928 | A1 | * | 1/2006 | Holloway | G06F 9/4448 717/136 |
| 2006/0143559 | A1 | * | 6/2006 | Spielberg | G06F 3/165 715/201 |
| 2007/0250810 | A1 | * | 10/2007 | Tittizer | G06F 8/73 717/110 |

(Continued)

OTHER PUBLICATIONS

Andrew Begel, Program Commenting by Voice, May 28, 2002, [Retrieved on Apr. 1, 2016]. Retrieved from the internet: <URL: http://research.microsoft.com/en-us/um/people/abegel/cs294-1/voice-comments.pdf> 370 Pages (1-10).*

(Continued)

*Primary Examiner* — Thuy Dao
*Assistant Examiner* — Anibal Rivera
(74) *Attorney, Agent, or Firm* — Schwegman Lundberg & Woessner, P.A.

(57) ABSTRACT

A system and method of adding on-the-fly comments to source code are described. In some embodiments, audio data comprising a comment for source code in a source code file is received. The comment is stored in association with the source code, and an indication of the comment is caused to be displayed within the source code file to a user on a computing device. In some embodiments, an indication of a location within the source code file with which to associate the comment is received, and the comment can be stored in association with the location within the source code file. The comment can be caused to be displayed at the location within the source code file. In some embodiments, the audio data is converted to a textual representation of the comment. In some embodiments, the comment is translated from an original language to at least one additional language.

13 Claims, 13 Drawing Sheets

(56) References Cited

U.S. PATENT DOCUMENTS

| | | | | |
|---|---|---|---|---|
| 2007/0288889 A1* | 12/2007 | Harrison | | G06F 8/73 717/110 |
| 2008/0313208 A1* | 12/2008 | Hourselt | | G06F 8/73 |
| 2009/0006996 A1* | 1/2009 | Saha | | G06F 21/6218 715/765 |
| 2010/0058291 A1* | 3/2010 | Hahn | | G06F 8/70 717/113 |
| 2010/0162209 A1* | 6/2010 | Brown | | G06F 8/73 717/110 |
| 2010/0313186 A1* | 12/2010 | Chiodo | | G06F 11/3624 717/131 |
| 2012/0254835 A1* | 10/2012 | Muddu | | G06F 8/36 717/121 |

OTHER PUBLICATIONS

Christine Masuoka, Java Programming Using Voice Input, 2008, [Retrieved on Apr. 1, 2016]. Retrieved from the internet: <URL: https://www.cs.umd.edu/users/meesh/honors/cmasuoka_HonorsProjectReport.pdf> 16 Pages (1-16).*

* cited by examiner

```
300 import java.applet.*;                              310
import java.awt.*;
import java.net.*;
import java.util.*;

public class Example extends Applet implements Runnable {
   protected Image[] images;
    protected int current_image;

// This is an example of a comment!    320A public void init() {
      String basename = this.getParameter("basename");
      int num_images;
      try { num_images = Integer.parseInt(this.getParameter("num_images")); }
      catch (NumberFormatException e) { num_images = 0; } images = new Image[num_images];
      for(int i = 0; i < num_images; i++) {
         images[i] = this.getImage(this.getDocumentBase(), basename + i);
      }
   }
   private Thread example_thread = null;
   public void start() {
      if (example_thread == null) {
         example_thread = new Thread(this);
         example_thread.start();
      }
   }
   public void stop() {
      if ((example_thread != null) && example_thread.isAlive())
         example_thread.stop();
      example_thread = null;
   }
```

*FIG. 3A*

```
300
                                                              310
import java.applet.*;
import java.awt.*;
import java.net.*;
import java.util.*;

public class Example extends Applet implements Runnable {
    protected Image[] images;
    protected int current_image;         320A
                                                    325
    // This is an example of a comment!
                                         English
    public void init() {                 Chinese
        String basename = this.getParame Russian
        int num_images;                  Spanish
        try { num_images = Integer.parseI        rameter("num_images")); }
        catch (NumberFormatException e) { num_images = 0; } images = new Image[num_images];
        for(int i = 0; i < num_images; i++) {
            images[i] = this.getImage(this.getDocumentBase(), basename + i);
        }
    }
    private Thread example_thread = null;
    public void start() {
        if (example_thread == null) {
            example_thread = new Thread(this);
            example_thread.start();
        }
    }
    public void stop() {
        if ((example_thread != null) && example_thread.isAlive())
            example_thread.stop();
        example_thread = null;
    }
```

*FIG. 3B*

```
import java.applet.*;
import java.awt.*;
import java.net.*;
import java.util.*;

public class Example extends Applet implements Runnable {
   protected Image[] images;
    protected int current_image;

Link to comment for init()      320C public void init() {
      String basename = this.getParameter("basename");
      int num_images;
      try { num_images = Integer.parseInt(this.getParameter("num_images")); }
      catch (NumberFormatException e) { num_images = 0; } images = new Image[num_images];
      for(int i = 0; i < num_images; i++) {
         images[i] = this.getImage(this.getDocumentBase(), basename + i);
      }
   }
   private Thread example_thread = null;
   public void start() {
      if (example_thread == null) {
         example_thread = new Thread(this);
         example_thread.start();
      }
   }
   public void stop() {
      if ((example_thread != null) && example_thread.isAlive())
         example_thread.stop();
      example_thread = null;
   }
```

300 — (arrow to box)
310 — (label for code box)

*FIG. 3C*

```
300 import java.applet.*;                                              310
import java.awt.*;
import java.net.*;
import java.util.*;

public class Example extends Applet implements Runnable {
    protected Image[] images;
    protected int current_image;

[Comment]  ←—320D public void init() {
        String basename = this.getParameter("basename");
        int num_images;
        try { num_images = Integer.parseInt(this.getParameter("num_images")); }
        catch (NumberFormatException e) { num_images = 0; } images = new Image[num_images];
        for(int i = 0; i < num_images; i++) {
            images[i] = this.getImage(this.getDocumentBase(), basename + i);
        }
    }
    private Thread example_thread = null;
    public void start() {
        if (example_thread == null) {
            example_thread = new Thread(this);
            example_thread.start();
        }
    }
    public void stop() {
        if ((example_thread != null) && example_thread.isAlive())
            example_thread.stop();
        example_thread = null;
    }
```

*FIG. 3D*

```
import java.applet.*;
import java.awt.*;
import java.net.*;
import java.util.*;

public class Example extends Applet implements Runnable {
   protected Image[] images;
    protected int current_image;
```
```
   public void init() {
      String basename = this.getParameter("basename");
      int num_images;
      try { num_images = Integer.parseInt(this.getParameter("num_images")); }
      catch (NumberFormatException e) { num_images = 0; } images = new Image[num_images];
      for(int i = 0; i < num_images; i++) {
         images[i] = this.getImage(this.getDocumentBase(), basename + i);
      }
   }
   private Thread example_thread = null;
   public void start() {
      if (example_thread == null) {
         example_thread = new Thread(this);
         example_thread.start();
      }
   }
   public void stop() {
      if ((example_thread != null) && example_thread.isAlive())
         example_thread.stop();
      example_thread = null;
   }
```

```
import java.applet.*;
import java.awt.*;
import java.net.*;
import java.util.*;

public class Example extends Applet implements Runnable {
    protected Image[] images;
    protected int current_image;

public void init() {
        String basename = this.getParameter("basename");
        int num_images;
        try { num_images = Integer.parseInt(this.getParameter("num_images")); }
        catch (NumberFormatException e) { num_images = 0; } images = new Image[num_images];
        for(int i = 0; i < num_images; i++) {
            images[i] = this.getImage(this.getDocumentBase(), basename + i);
        }
    }
    private Thread example_thread = null;
    public void start() {
        if (example_thread == null) {
            example_thread = new Thread(this);
            example_thread.start();
        }
    }
    public void stop() {
        if ((example_thread != null) && example_thread.isAlive())
            example_thread.stop();
        example_thread = null;
    }
```

FIG. 3F

```
300
   ┌─────────────────────────────────────────────────────┐
   │ import java.applet.*;                        ┌─310  │
   │ import java.awt.*;                                  │
   │ import java.net.*;                                  │
   │ import java.util.*;                                 │
   │                                                     │
   │ public class Example extends Applet implements Runnable {
   │    protected Image[] images;                        │
   │    protected int current_image;                     │
   │                                                     │
   │   ┌─────────────────────────────────┐               │
   │   │ This is an example of a comment!│────320G       │
   │   └─────────────────────────────────┘               │
   │    public void init() {                             │
   │       String basename = this.getParameter("basename");
   │       int num_images;                               │
   │       try { num_images = Integer.parseInt(this.getParameter("num_images")); }
   │       catch (NumberFormatException e) { num_images = 0; }
   │                                                     │
   │       images = new Image[num_images];               │
   │       for(int i = 0; i < num_images; i++) {         │
   │          images[i] = this.getImage(this.getDocumentBase(), basename + i);
   │       }                                             │
   │    }                                                │
   │    private Thread example_thread = null;            │
   │    public void start() {                            │
   │       if (example_thread == null) {                 │
   │          example_thread = new Thread(this);         │
   │          example_thread.start();                    │
   │       }                                             │
   │    }                                                │
   │    public void stop() {                             │
   │       if ((example_thread != null) && example_thread.isAlive())
   │          example_thread.stop();                     │
   │       example_thread = null;                        │
   │    }                                                │
   └─────────────────────────────────────────────────────┘
```

*FIG. 3G*

ADDING ON-THE-FLY COMMENTS TO CODE

TECHNICAL FIELD

The present application relates generally to the technical field of data processing, and, in various embodiments, to systems and methods of adding on-the-fly comments to source code.

BACKGROUND

Program developers and quality engineers write hundreds of thousands of code every day to develop and test new software features and products. A significant amount of their time is spent reading and understanding an existing code base. Without proper comments, they can end up cluelessly reading old legacy code in the hunt for a software bug. In computer programming, a comment is a programming language construct used to embed programmer-readable annotations in the source code of a computer program. Those annotations are potentially significant to programmers, but are generally ignored by compilers and interpreters. Comments are usually added with the purpose of making the source code easier to understand. Unfortunately, since adding comments to code can take up a considerable amount of time and effort, it is often avoided.

BRIEF DESCRIPTION OF THE DRAWINGS

Some embodiments of the present disclosure are illustrated by way of example and not limitation in the figures of the accompanying drawings, in which like reference numbers indicate similar elements, and in which:

FIGS. 3A-3G illustrate examples of displaying an indication of a comment, in accordance with some embodiments;

DETAILED DESCRIPTION

Figure 1:
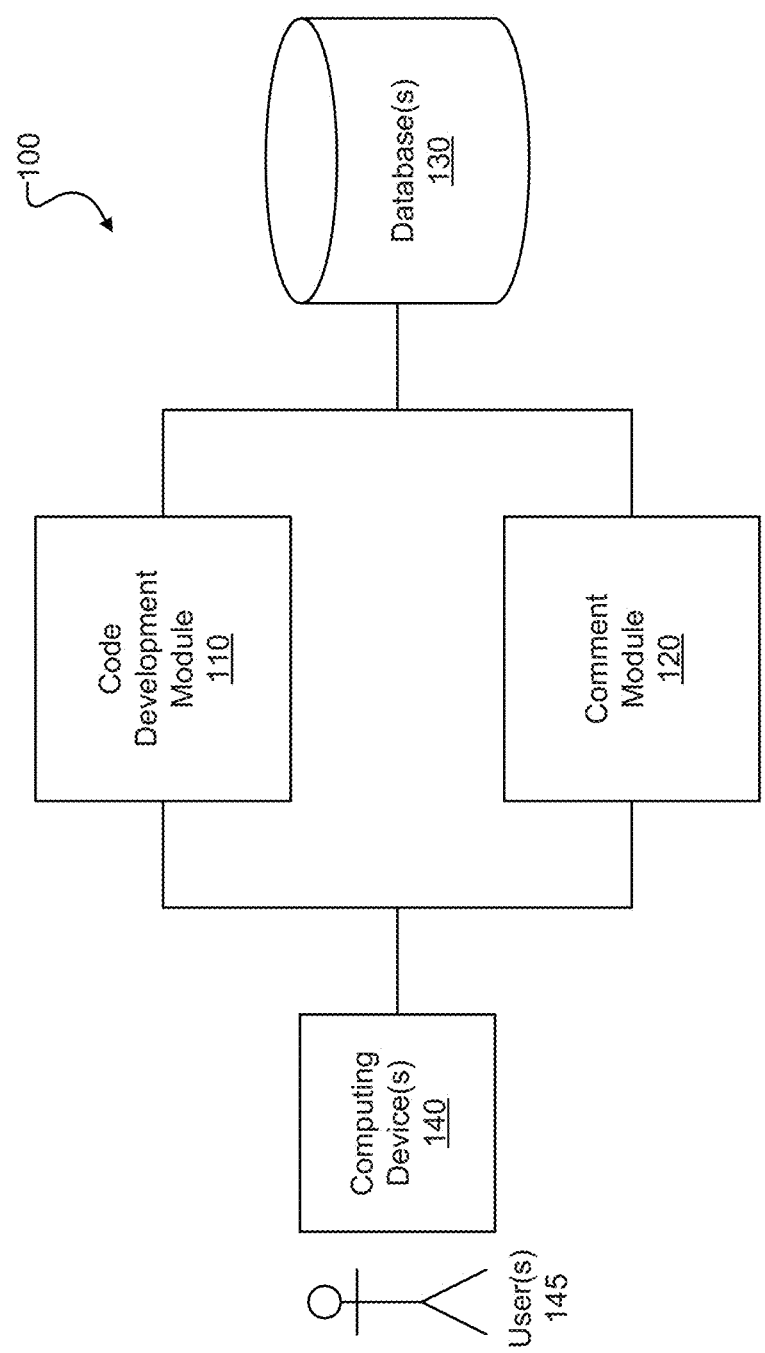
FIG. 1 illustrates a system for adding on-the-fly comments to source code within a source code file, in accordance with some embodiments.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure describes systems and methods of adding on-the-fly comments to source code. The techniques described herein enable a user to easily provide comments by speaking as they are coding. These audio-based comments can be captured using any suitable devices having audio capture capabilities, including but not limited to, microphones connected to a computing device, smart phones, tablets, video cameras, laptops, desktop computers, and the like. Using text-to-speech and voice-to-text technologies, comments in one format can be changed to another format based on the code reader's preference. Multimedia comment files comprising the comments can be source-controlled and version-managed in the same repository where the code lives. The techniques described herein provide a seamless experience of writing and reading code, thereby attracting coders to add proper comments. The resulting increase in comment coverage in for code bases will reduce the time spent by program developers and quality engineers in understanding the code bases, leading to an increase in productivity, both for commenters and readers.

In some embodiments, audio data comprising a comment for source code in a source code file is received. The comment can be stored in association with the source code. An indication of the comment can be caused to be displayed within the source code file to a user on a computing device.

In some embodiments, an indication of a location within the source code file with which to associate the comment is received, and the comment is stored in association with the location within the source code file, and the comment can be caused to be displayed at the location within the source code file. In some embodiments, the location comprises a line number.

In some embodiments, the audio data is converted to a textual representation of the comment. In some embodiments, the indication of the comment comprises the textual representation of the comment. In some embodiments, the indication of the comment comprises a selectable link to the textual representation of the comment. In some embodiments, the indication of the comment comprises a selectable link configured to cause an audio representation of the comment to be played to the user on the computing device in response to its selection.

In some embodiments, the comment is translated from an original language to at least one additional language, and the comment is stored in the original language and in the at least one additional language. In some embodiments, the comment is translated from an original language to an additional language in response to a user instruction, and the comment is presented in the additional language to the user. In some embodiments, a textual representation of the comment in the additional language is caused to be displayed to the user. In some embodiments, an audio version of the comment in the additional language is caused to be played to the user.

In some embodiments, an original version of the comment is edited in response to an instruction from the user or another user to edit the original version of the comment, thereby forming an edited version of the comment distinct from the original version of the comment, and the edited version of the comment is stored concurrently with the original version of the comment.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 illustrates a system 100 for adding on-the-fly comments to source code within a source code file, in accordance with some embodiments. In FIG. 1, a code development module 110 may be used by one or more users 145 on one or more computing devices 140 to write source code. Source code is a collection of computer instructions written using a human-readable computer language, usually as text. The source code specifies the actions to be performed by a computer. The source code can be saved in a source code file, and is often transformed by a compiler program into low-level machine code understood by the computer. In some embodiments, the code development module 110 comprises a programming or software development tool. In some embodiments, the code development module 110 comprises a word processing application. The source code files can be saved in one or more databases 130.

User(s) 145 can use comment module 120 to add comments to a source code file. In some embodiments, comment module 120 comprises a plug-in tool for code development module 110. Accordingly, comment module 120 can communicate with code development module 110. In some embodiments, code development module 110 and comment module 120 reside on the same computing device. In some embodiments, code development module 110 and comment module 120 reside on the computing device 140 of the user 145. Examples of computing device(s) 140 include, but are not limited to, a desktop computer, a laptop computer, a smart phone, a tablet computer, and a wearable computing device. Other types of computing devices 140 are also within the scope of the present disclosure. In some embodiments, code development module 110 and comment module 120 comprise cloud-based applications that the user(s) 145 accesses via one or more networks (e.g., the Internet). Other configurations are also within the scope of the present disclosure.

In some embodiments, comment module 120 is configured to receive audio data from user 145 on computing device 140. Computing device 140 may comprise an audio capture device, such as a microphone, with which to capture audio provided by user 145, such as the voice of the user 145, while user 145 is using code development module 110 to code. The resulting captured audio data can then be provided by computing device 140 to comment module 120.

In some embodiments, the audio data comprises a comment for source code in a source code file that user 145 is accessing and working on using code development module 110. A comment is a programming language construct used to embed programmer-readable annotations in the source code of a computer program. The annotations are potentially significant to programmers, but are generally ignored by compilers and interpreters. Comments are usually added with the purpose of making the source code easier to understand. The syntax and rules for comments vary and are usually defined in a programming language specification.

In some embodiments, comment module 120 is configured to store the comment of the audio data in association with the source code of the source code file being worked on by user 140. The comment module 120 can store the comment in association with a specific location within the source code file. The specific location may comprise a line number. Other types of specific locations are also within the scope of the present disclosure. In some embodiments, an indication of the specific location is provided by user 145 and may be included in the audio data provided to comment module 120. For example, while coding, user 140 speak a location (e.g., "line 7") into a microphone of computing device 140 before speaking the comment into the microphone. Comment module 120 may determine to process words as a location identifier based on a recognition of certain words as an indications of location identifiers. For example, comment module 120 may be configured to interpret the phrase "Insert comment at line" as an instruction to insert upcoming words at a line number that is specified immediately after "line." In some embodiments, comment module 120 is configured to recognize an identification of a subroutine (e.g., procedure, function, etc.) as a location identifier. In one example, comment module 120 may be configured to interpret the phrase "Insert comment for function foo" as an instruction to insert the corresponding comment at a location corresponding to "function foo" in the source code file, such as immediately preceding "function foo." It is contemplated that other techniques for identifying the location at which a comment should be placed are also within the scope of the present disclosure.

Figure 2:
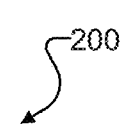
FIG. 2 illustrates a mapping of comments to source code files, in accordance with some embodiments.

FIG. 2 illustrates a mapping 200 of comments to source code files, in accordance with some embodiments. As seen in FIG. 2, each source code file (e.g., Source Code File A) can have one or more comments (e.g., Comment A, Comment B, Comment C) associated with it. Each comment can have a corresponding location within the source code file (e.g., Line 1, Line 11, Line 24). In some embodiments, comment module 120 is configured to enable the user 145 to edit, or provide instructions for editing, an original version of the comment, thereby forming an edited version of the comment distinct from the original version of the comment. The edited version of the comment can be stored concurrently with the original version of the comment. For example, in FIG. 2, the user 145 can edit Source Code File A by editing Comment B (e.g., adding/removing characters/words in the comment), removing Comment C, and adding Comment D. As a result, an edited version of Source Code File A can be created in the form of Source Code File A', which can have Comment A, Comment B' (an edited version of Comment B), and Comment D stored in association with it along with their corresponding locations. Other configurations are also within the scope of the present disclosure.

In some embodiments, the editing of a source code file and/or its comments can be restricted to only the original author. In some embodiments, the editing of a source code file and/or its comments can be restricted to only a specified group of users 145 having permission to make such edits.

In some embodiments, comment module 120 is configured to cause an indication of a comment to be displayed within the corresponding source code file to one or more users 145 on computing device(s) 140. FIGS. 3A-3G illustrate examples of displaying an indication of a comment in a source code file 300 having source code 310, in accordance with some embodiments.

In FIG. 3A, indication 320A of a comment is displayed as being embedded within the source code 310 of source code file 300. In some embodiments, indication 320A of the comment comprises a textual representation of the comment (e.g., "//This is an example of a comment!" in FIG. 3A), which can be formed from a conversion of the audio data to the textual representation by comment module 120. In some embodiments, comment module 120 employs speech recognition technology to convert the audio data to a textual representation. The textual representation of the comment can be stored along with the audio version of the comment.

In some embodiments, the comment can be translated from an original language to at least one additional language. In FIG. 3B, comment module 120 enables the user 145 to view the comment in another language (e.g., Chinese, Russian, Spanish) than the language in which it is currently displayed (e.g., English). For example, comment module 120 may cause a plurality of selectable language options 325 to be displayed to the user 145, thereby enabling the user 145 to select a language in which to view the comment. In response to a user selection of one of the language options 325, comment module 120 may cause the comment to be displayed to the user 145 in that selected language.

In some embodiments, comment module 120 may automatically determine what language to display the comment in based on an identification of the user 145 to whom it is being presented. For example, comment module 120 may automatically display the comment to the user 145 in Chinese based on a determination that Chinese is the user's primary language. Such determination can be made based on an analysis of a profile of the user 145. For example, the user 145 may have previously registered this information with comment module 120. In some embodiments, comment module 120 can determine a primary language of the user 145 based on a determined location (e.g., via an Internet Protocol address) of the user 145.

In some embodiments, a comment can be translated into one or more additional languages upon being received by comment module 120, and the additional language versions of the comment can then be stored in database(s) along with the original language version. In some embodiments, a comment can be translated on-the-fly in response to a request by the user 145 (e.g., the user 145 selecting one of the language options 325 in FIG. 3B), and not stored in database(s) 130 in order to save storage space.

In FIG. 3C, indication 320C of a comment is displayed as being embedded within the source code 310 of source code file 300. In some embodiments, indication 320C comprises a selectable link to the actual comment, thereby enabling the user to view the comment by selecting the selectable link. This approach may be beneficial when the user does not want the actual source code 310 to be interrupted with a large comment. Selection of the selectable link can cause the entire corresponding comment to be displayed, either on the same page or in a separate window. The comment can be presented to the user in a human-readable form, such as text or an image of text. Other configurations of indication 320C are also within the scope of the present disclosure.

In FIG. 3D, indication 320D of a comment is displayed as being embedded within the source code 310 of source code file 300. Indication 320D is similar to indication 320C in FIG. 2C in that it comprises a selectable link to the actual comment. However, whereas indication 320C in FIG. 3C is shown as selectable text, indication 320D in FIG. 3D is shown as a selectable image (e.g., an image of a folder with the word "Comment"). Other configurations of indication 320D are also within the scope of the present disclosure.

In FIG. 3E, indication 320E of a comment is displayed as being embedded within the source code 310 of source code file 300. Indication 320E can comprise a selectable link configured to cause an audio representation of the comment to be played to the user 145 on the computing device 140 in response to its selection. Accordingly, in some embodiments, indication 320E may comprise a selectable image (e.g., a selectable audio icon in FIG. 3E). In some embodiments, indication 320E may comprise selectable text. Other configurations of indication 320E are also within the scope of the present disclosure.

As discussed with respect to FIG. 3B above, in some embodiments, the comment can be translated from an original language to at least one additional language. Accordingly, in FIG. 3F, comment module 120 may cause a plurality of selectable language options 325 to be displayed to the user 145, thereby enabling the user 145 to select a language in which to listen to the comment. In response to a user selection of one of the language options 325, comment module 120 may cause an audio version of the comment in the selected language to be played to the user 145. The additional language audio versions of the comment can be previously stored and then retrieved in response to the user's request to listen to the comment in the additional language, or can be generated on-the-fly in response to the user's request.

In some embodiments, the user 140 can capture an image of a comment to embed within the source code 310 in the source code file. For example, the user 145 may think of a comment when he or she is away from his or her main computing device 140 on which the coding and commenting are typically performed. In such a situation, the user 145 can write down the comment on a piece of paper, and then take a picture of the comment on the piece of paper, such as by using a built-in camera on the user's smartphone. The user 145 can then upload the comment, in image form, to comment module 120 along with instructions on where to insert it. Comment module 120 can then insert the image of the comment in the appropriate location. In FIG. 3G, indication 320G of a comment is displayed as being an image of a comment embedded within the source code 310 of source code file 300.

It is contemplated that configurations of comments and indications of comments other than those shown in FIGS. 3A-3G are also within the scope of the present disclosure.

Figure 4A:
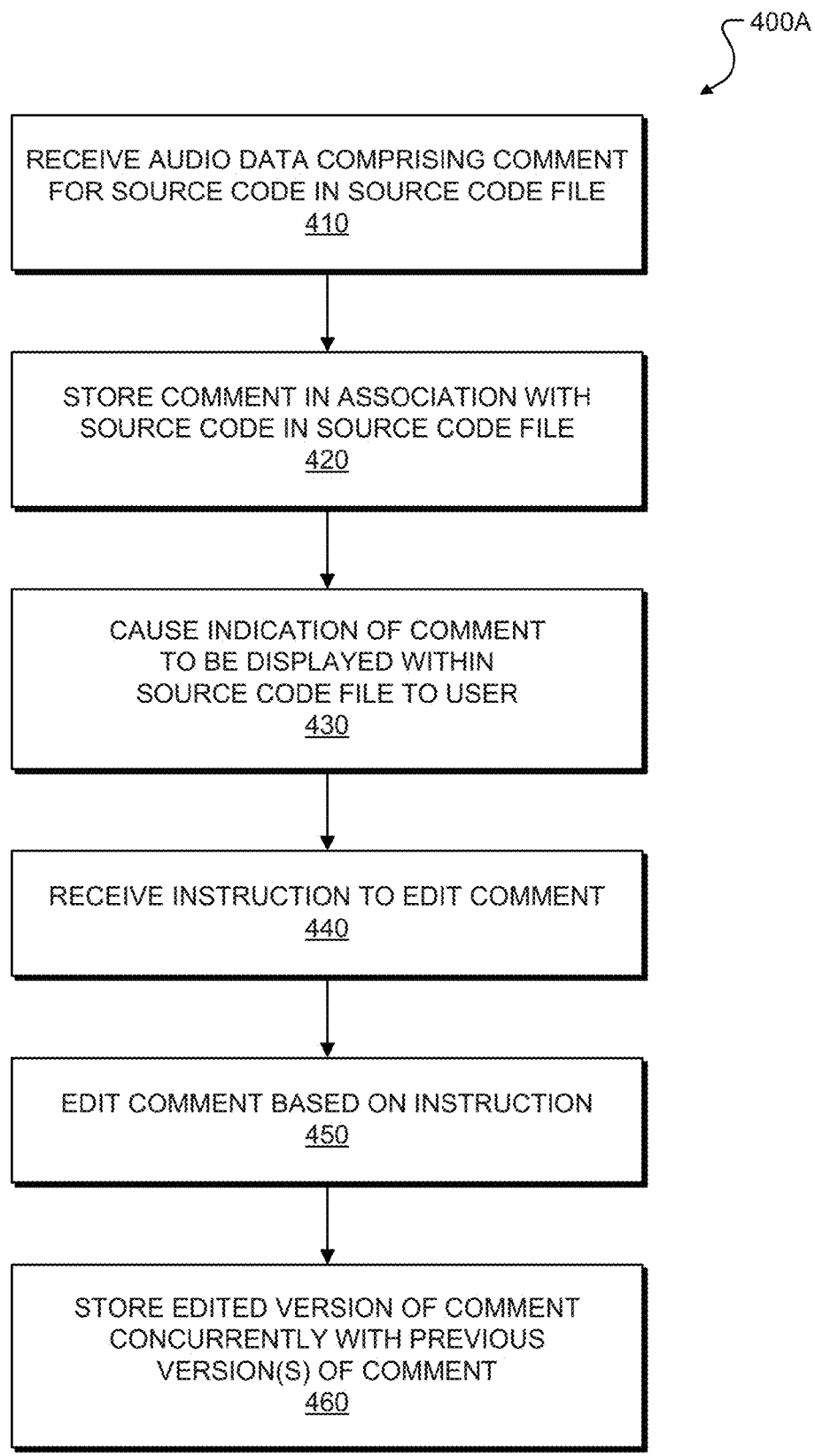
FIG. 4A is a flowchart illustrating a method of adding on-the-fly comments, in accordance with some embodiments.

FIG. 4A is a flowchart illustrating a method 400A of adding on-the-fly comments, in accordance with some embodiments. The operations of method 400A may be performed by a system or modules of a system (e.g., comment module 120). At operation 410, audio data can be received. The audio data can comprise a comment for source code in a source code file. In some embodiments, an indication of a location within the source code file with which to associate the comment can be received, either within the audio data or separately from the audio data. At operation 420, the comment can be stored in association with the source code in the source code file. In some embodiments, the comment is stored in association with the location within the source code file that is indicated by the indication of the location. At operation 430, an indication of the comment can be caused to be displayed within the source code file to the user. As previously discussed, the indication can comprise the actual comment itself or a link to the actual comment. At operation 440, an instruction to edit the comment can be received from the user. At operation 450, the comment can be edited based on the instruction from the user, thereby forming an edited version of the comment. At operation 460, the edited version of the comment is stored concurrently with any previous versions of the comment. It is contemplated that the operations of method 400A may incorporate any of the other features disclosed herein.

In some embodiments, at operation 410, the comment can be provided by the user to the comment module 120 in a form other than an audio file. For example, the comment can be provided in textual form or image form. The user can provide the comment from his or her code development workstation or from a mobile device that is in communication with the code development workstation or with communication module 120. In one example, the user can connect his tablet computer (e.g., an iPad®) to his development workstation, draw a picture on the tablet computer, and add that image-based comment (the drawing) to the source code just as an audio-based comment is described as being added to the source code. The user can also capture an image of a comment to embed within the source code 310 in the source code file, as mentioned above with respect to FIG. 3G. Other examples are also within the scope of the present disclosure. Accordingly, the features of the present disclosure enable a user to add comments to source code in a variety of formats (e.g., audio, text, images, etc.) from a variety of computing devices (e.g., a desktop computer, a laptop computer, a smartphone, a tablet computer, etc.) and via a variety of communication connections (e.g., a mobile device communicating a comment to a desktop computer, which communicates the comment to comment module 120), thereby providing a convenient and flexible way for the user to add comments to source code on-the-fly.

It is contemplated that operations of converting an audio representation of the comment into a textual representation of a comment, converting a textual representation of the comment into an audio representation of the comment, and translating a comment from one language to one or more additional languages can also be performed, as previously discussed. Accordingly, these operations can be incorporated into method 400A. FIGS. 4B-4E illustrate portions of method 400A having these operations inserted in different locations. Therefore, the methods of FIGS. 4B-4E may comprise any of the operations or features of method 400A in FIG. 4A.

Figure 4B:
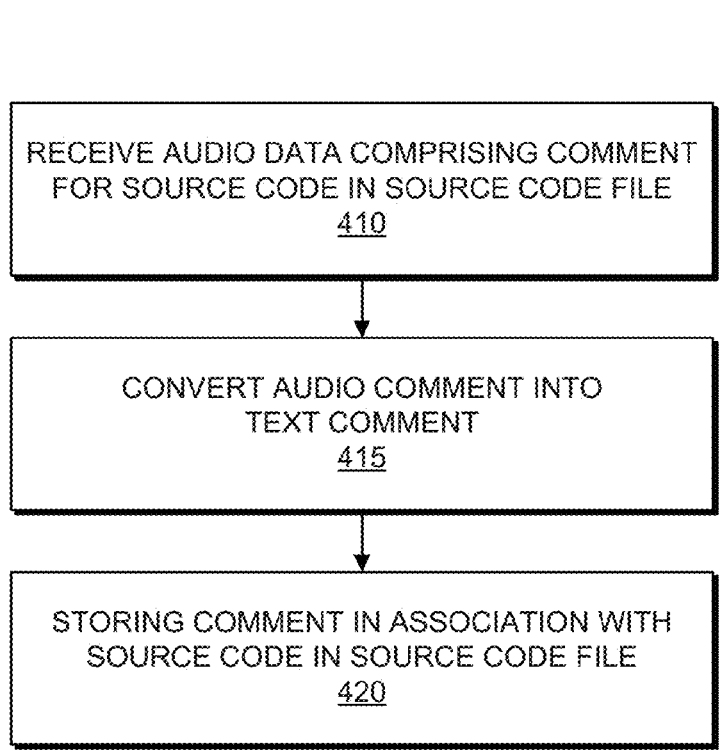
FIGS. 4B-4C are flowcharts illustrating methods of converting an audio representation of a comment into a textual representation of the comment, in accordance with some embodiments.

As previously discussed, in some embodiments, the audio version of the comment can be converted into a textual representation. In some embodiments, the textual representation of the comment can be stored along with the audio version of the comment. FIG. 4B is a flowchart illustrating a method 400B of converting an audio representation of a comment into a textual representation of the comment, in accordance with some embodiments. The operations of method 400B may be performed by a system or modules of a system (e.g., comment module 120). At operation 410, audio data can be received. At operation 415, the audio representation of the comment is converted into a textual representation of the comment. At operation 420, the comment can be stored in association with the source code in the source code file. Here, both the audio representation of the comment as well as the textual representation of the comment can be stored concurrently. It is contemplated that the operations of method 400B may incorporate any of the other features disclosed herein.

Figure 4C:
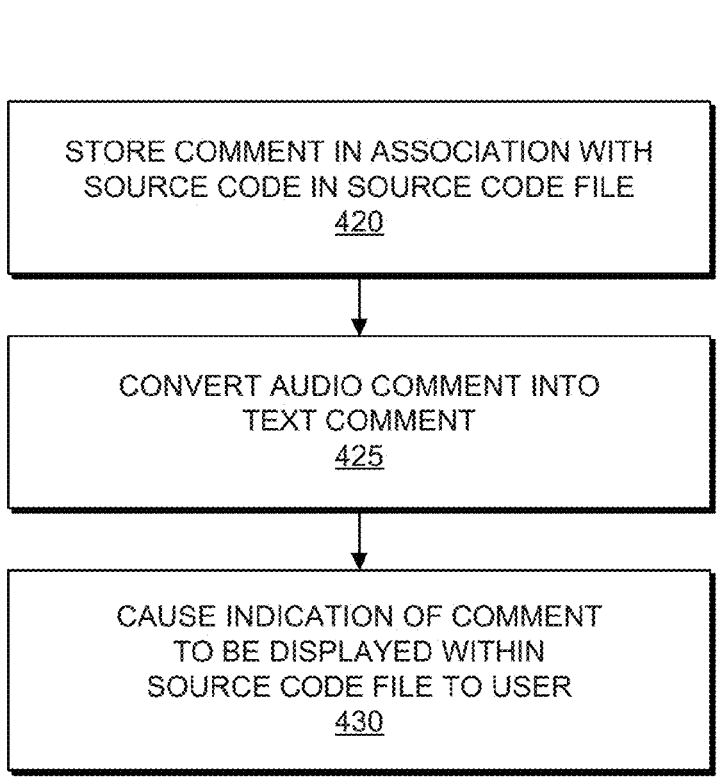

In some embodiments, the audio representation of the comment can be converted into a textual representation on-the-fly in response to a request by the user to view the textual representation of the comment, with only the audio version of the comment being stored. FIG. 4C is a flowchart illustrating a method 400C of converting an audio representation of a comment into a textual representation of the comment, in accordance with some embodiments. The operations of method 400C may be performed by a system or modules of a system (e.g., comment module 120). At operation 420, an audio representation of the comment can be stored in association with the source code in the source code file. At operation 425, the audio representation of the comment is converted into a textual representation of the comment. At operation 430, an indication of the comment can be caused to be displayed within the source code file to the user. This indication can comprise the textual representation of the comment. It is contemplated that the operations of method 400C may incorporate any of the other features disclosed herein.

Figure 4D:
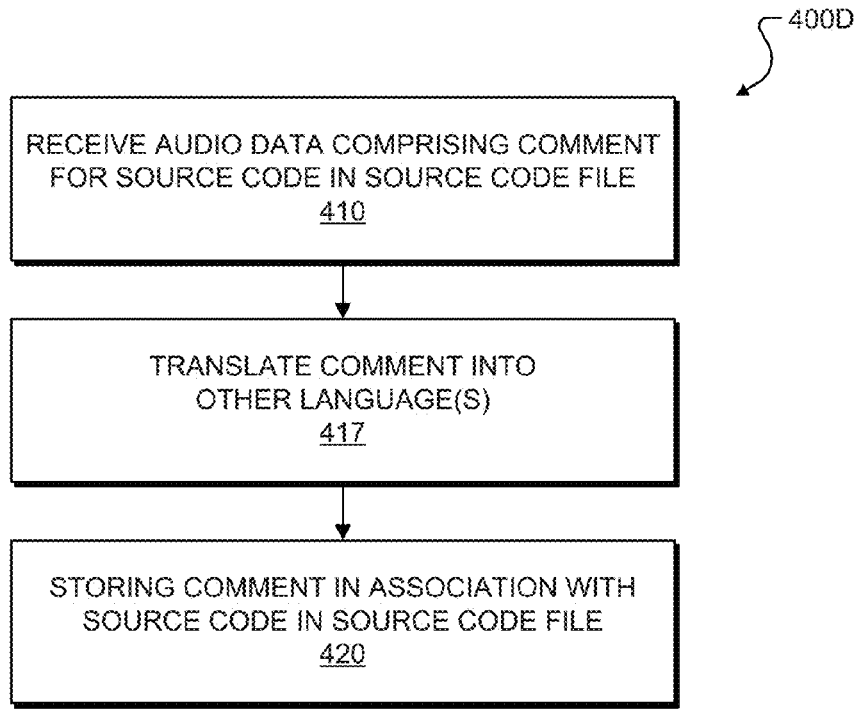
FIGS. 4D-4E are flowcharts illustrating methods of translating the comments from an original language into at least one additional language, in accordance with some embodiments.

As previously discussed, in some embodiments, the comment can be translated from an original language to at least one additional language. In some embodiments, the additional language version(s) of the comment can be stored along with the original language version of the comment. FIG. 4D is a flowchart illustrating a method 400D of translating the comments from an original language into at least one additional language, in accordance with some embodiments. The operations of method 400D may be performed by a system or modules of a system (e.g., comment module 120). At operation 410, audio data can be received. At operation 417, the comment is translated from its originally-provided language into one or more other languages. At operation 420, the original language version of the comment along with the one or more additional language versions of the comment can be stored in association with the source code in the source code file. It is contemplated that the operations of method 400D may incorporate any of the other features disclosed herein.

Figure 4E:
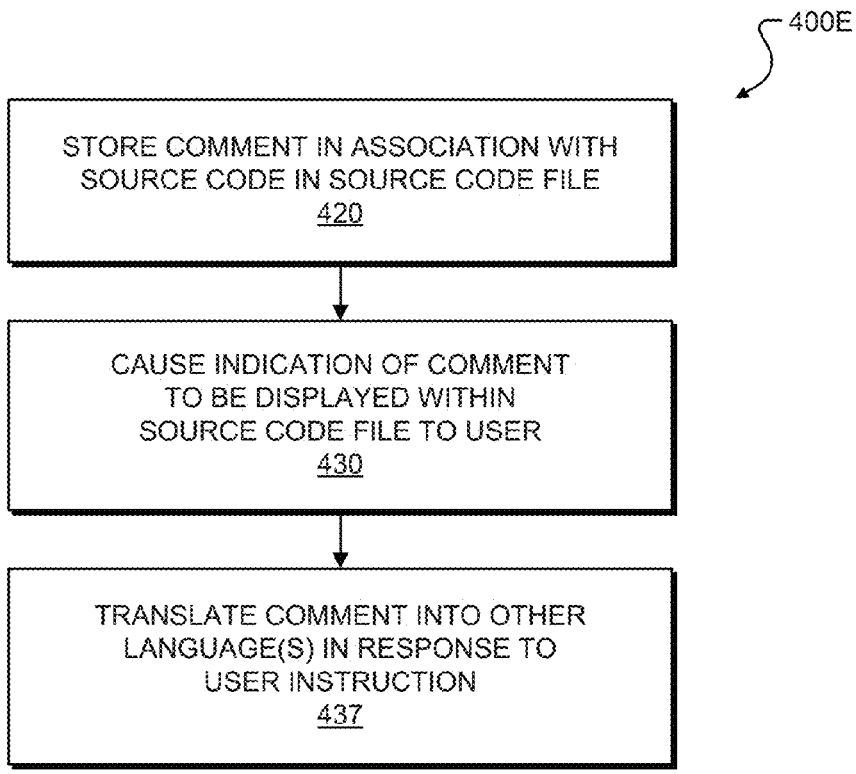

As previously discussed, in some embodiments, one or more additional language versions of the comment can be generated on-the-fly in response to the user's request or instruction. FIG. 4E is a flowchart illustrating a method 400E of translating the comments from an original language into at least one additional language, in accordance with some embodiments. The operations of method 400E may be performed by a system or modules of a system (e.g., comment module 120). At operation 420, an original language version of the comment can be stored in association with the source code in the source code file. At operation 430, an indication of the comment can be caused to be displayed within the source code file to the user. At operation 437, the comment is translated from its originally-provided language into one or more other languages in response to the user's request or instruction. The comment can then be provided to the user in the additional language(s). It is contemplated that the operations of method 400E may incorporate any of the other features disclosed herein.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 5:
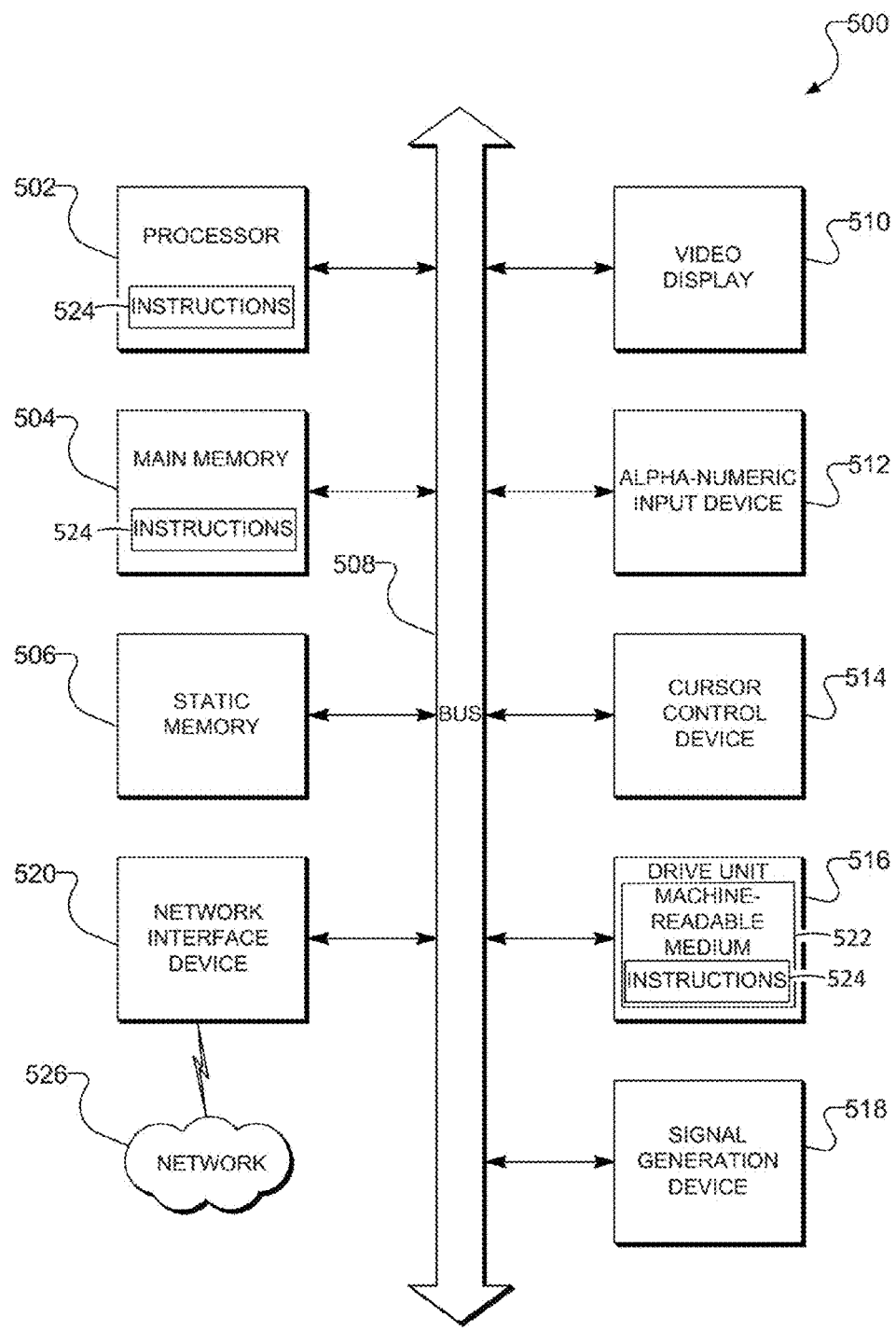
FIG. 5 shows a diagrammatic representation of a machine in the example form of a computer system within which a set of instructions may be executed to cause the machine to perform any one or more of the methodologies discussed herein, in accordance with some embodiments.

FIG. 5 is a block diagram of a machine in the example form of a computer system 500 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation (or cursor control) device 514 (e.g., a mouse), a disk drive unit 516, a signal generation device 518 (e.g., a speaker), and a network interface device 520.

Machine-Readable Medium

The disk drive unit 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media. The instructions 524 may also reside, completely or at least partially, within the static memory 506.

While the machine-readable medium 522 is shown in an example embodiment to be a single medium, the term "machine-readable medium" may include a single medium or multiple media (e.g., a centralized or distributed database, and/or associated caches and servers) that store the one or more instructions 524 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
   receiving audio data comprising a comment for source code in a source code file;
   receiving an indication of a location within the source code file with which to associate the comment;
   converting the audio data to a textual representation of the comment;
   storing, by a machine having a memory and at least one processor, the audio data and the textual representation of the comment in association with the location within the source code file;

determining a location of a user;
determining a primary language of the user based, at least in part, on the determined location of the user;
causing an indication of the comment to be displayed at the location within the source code file to a user on a computing device, the indication of the comment comprising a selectable link to the textual representation of the comment, the selectable link being configured to cause the textual representation of the comment to be displayed to the user on the computing device in response to a selection of the selectable link; and
causing the comment to be presented, to the user on the computing device, in the determined primary language of the user based on the determination of the primary language.

2. The method of claim 1, wherein the location within the source code file comprises a line number.

3. The method of claim 1, wherein the selectable link is further configured to cause an audio representation of the comment to be played to the user on the computing device in response to its selection.

4. The method of claim 1, further comprising translating the comment from an original language to at least one additional language, wherein storing the comment comprises storing the comment in the original language and in the at least one additional language.

5. The method of claim 1, further comprising:
translating the comment from an original language to an additional language in response to a user instruction; and
presenting the comment in the additional language to the user.

6. The method of claim 5, wherein presenting the comment in the additional language comprises causing a textual representation of the comment in the additional language to be displayed to the user.

7. The method of claim 5, wherein presenting the comment in the additional language comprises causing an audio version of the comment in the additional language to be played to the user.

8. The method of claim 1, further comprising:
editing an original version of the comment in response to an instruction from the user or another user to edit the original version of the comment, thereby forming an edited version of the comment distinct from the original version of the comment; and
storing the edited version of the comment concurrently with the original version of the comment.

9. A system comprising:
at least one processor and executable instructions accessible on a non-transitory computer-readable medium that, when executed, cause the at least one processor to perform operations comprising:
receive audio data comprising a comment for source code in a source code file;
receive an indication of a location within the source code file with which to associate the comment;
convert the audio data to a textual representation of the comment;
store the audio data and the textual representation of the comment in association with the location within the source code file;
determine a location of a user;
determine a primary language of the user based, at least in part, on the determined location of the user;
cause an indication of the comment to be displayed at the location within the source code file to a user on a computing device, the indication of the comment comprising a selectable link to the textual representation of the comment, the selectable link being configured to cause the textual representation of the comment to be displayed to the user on the computing device in response to a selection of the selectable link; and
cause the comment to be presented, to the user on the computing device, in the determined primary language of the user based on the determination of the primary language.

10. The system of claim 9, wherein the selectable link is further configured to cause an audio representation of the comment to be played to the user on the computing device in response to its selection.

11. The system of claim 9, wherein the operations further comprise:
translate the comment from an original language to at least one additional language; and
store the comment in the original language and in the at least one additional language.

12. The system of claim 9, wherein the operations further comprise:
translate the comment from an original language to an additional language in response to a user instruction; and
present the comment in the additional language to the user.

13. A non-transitory machine-readable storage medium storing a set of instructions that, when executed by at least one processor, causes the at least one processor to perform a set of operations comprising:
receiving audio data comprising a comment for source code in a source code file;
receiving an indication of a location within the source code file with which to associate the comment;
converting the audio data to a textual representation of the comment;
storing the audio data and the textual representation of the comment in association with the location within the source code file;
determining a location of a user;
determining a primary language of the user based, at least in part, on the determined location of the user;
causing an indication of the comment to be displayed at the location within the source code file to a user on a computing device, the indication of the comment comprising a selectable link to the textual representation of the comment, the selectable link being configured to cause the textual representation of the comment to be displayed to the user on the computing device in response to a selection of the selectable link; and
causing the comment to be presented, to the user on the computing device, in the determined primary language of the user based on the determination of the primary language.

\* \* \* \* \*